United States Patent [19]

Kershaw

[11] Patent Number: 4,833,815
[45] Date of Patent: May 30, 1989

[54] SHELLFISH LURE

[76] Inventor: Frederic R. Kershaw, 16919 Violet Prairie Rd., S.E., Tenino, Wash. 98589

[21] Appl. No.: 188,026

[22] Filed: Apr. 29, 1988

[51] Int. Cl.⁴ .............................................. A01K 69/00
[52] U.S. Cl. ....................................... 43/42.7; 43/100
[58] Field of Search .................. 43/42.7, 4.5, 100, 105

[56] References Cited

U.S. PATENT DOCUMENTS 3,757,452 9/1973 Parker ...................................... 43/4.5
4,271,625 6/1981 Archer .................................... 43/100

FOREIGN PATENT DOCUMENTS 1260088 3/1961 France ................................... 43/105

Primary Examiner—Gene P. Crosby
Attorney, Agent, or Firm—E. Russell Tarleton

[57] ABSTRACT

A shellfish lure (10) is formed of a bait hook (12), nests (18) of entangled loops (20), and a weight (22) attached to a main line (24). The loops (20) are formed of individual strands (30) of resilient, flexible monofilament line bound together at a common point by a crimp (32) to ensnare crabs (38) or other shellfish attracted to the bait.

9 Claims, 1 Drawing Sheet

SHELLFISH LURE

TECHNICAL FIELD

The present invention relates to fishing lures, and, more particularly, to a shellfish lure suitable for spin casting and the like.

BACKGROUND OF THE INVENTION

Crustaceans such as crabs and lobsters cannot be captured using typical spinning lures because of the inability to set a hook through their hard shells. Consequently, other methods must be used.

The most common method of capturing crabs and lobsters involves the use of baited traps that must be lowered to the sea floor and left for a period of time. This method does not lend itself to spin casting because the traps are too large and heavy for handling with a normal spin casting rod and reel. Consequently, the traps cannot be cast from shore but must be lowered into the water from a pier or boat.

Several devices for capturing crabs have been developed for use with fishing poles. The Linear Crab Trapping device disclosed in U.S. Pat. No. 4,697,381, issued to Esgro et al on Oct. 6, 1981, uses individual loops tied at selected points around bait secured to a main line that is engaged with a pole and reel. This device is designed to be lowered from a boat and is not suitable casting from shore into the surf or open water. In addition, the individual loops will tend to lie flat on the sea floor, allowing the crab to walk over them.

THe same is true of the Crab Lure and Trap disclosed in U.S. Pat. No. 3,815,276, issued to Harrison on June 11, 1974. This trap must be partially suspended above the sea floor to have a series of individual loops hang down around a hook. As such it would not function if it were cast from shore into breaking waves. In addition, casting of the trap would cause it to become entangled in the hook such that it would be unable to catch crabs.

The Crab Snaring Device of U.S. Pat. No. 4,216,607, that issued to Lyster on Aug. 12, 1980, utilizes individual loops tied around a ring with a slipknot that allows the loops to be tightened about the leg of a crab. While ostensibly designed for casting from shore, this device has the drawback of requiring the fisherman to pull the snare in to cause the loop to tighten about the crab's legs. In addition, the loops will have a tendency to lay flat on the sea floor, allowing the crabs to walk over them. As a result, this device is capable of catching only one crab at a time.

SUMMARY OF THE INVENTION

A shellfish lure suitable for spin casting and the like is provided. The lure comprises a means for holding bait, such as a hook, and one or more bundles of resilient strands of material forming nests of entangled loops.

In accordance with another aspect of the present invention, each nest of entangled loops is positioned on a main line to overlap the bait holding means when cast into the water to thereby ensnare shellfish attracted to the bait.

In accordance with another aspect of the present invention, the strands are formed of flexible monofilament line.

In accordance with another aspect of the present invention, each loop is formed of a single strand of flexible monofilament line.

In accordance with yet another aspect of the present invention, the ends of all loops in each bundle are bound together at a common point to form a single bundle of loops.

BRIEF DESCRIPTION OF THE DRAWINGS

The features and advantages of the present invention will be more readily appreciated as the same becomes better understood by reference to the following detailed description, when taken in conjunction with the accompanying drawings, wherein.

DETAILED DESCRIPTION OF THE PREFERRED EMBODIMENT

Figure 1:
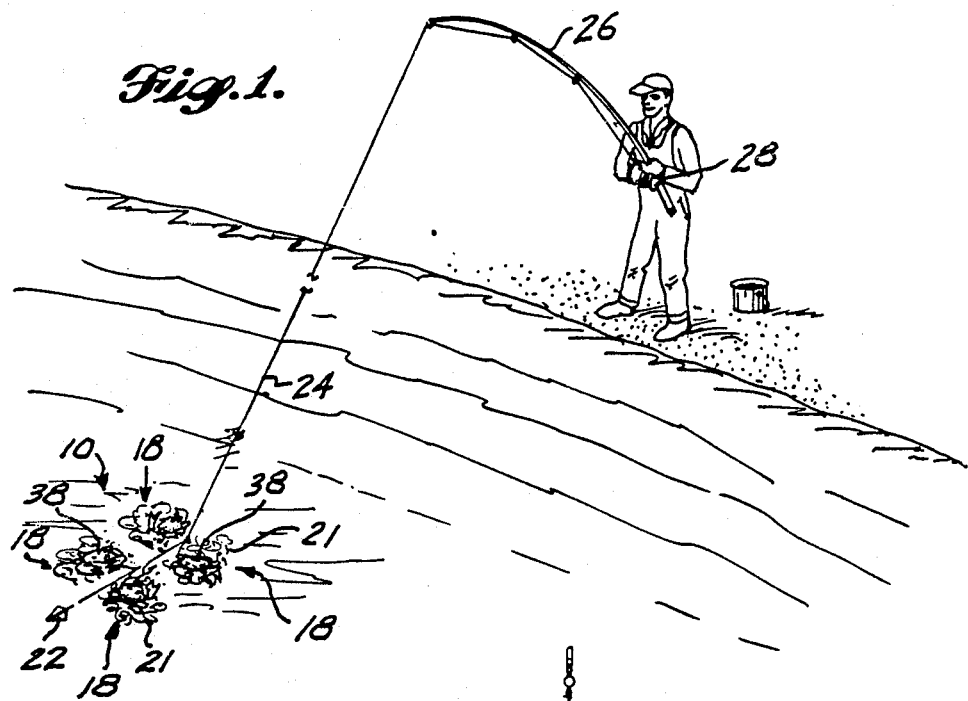
FIG. 1 is an isometric view depicting the operation of the shellfish lure formed in accordance with the present invention.
Figure 2:
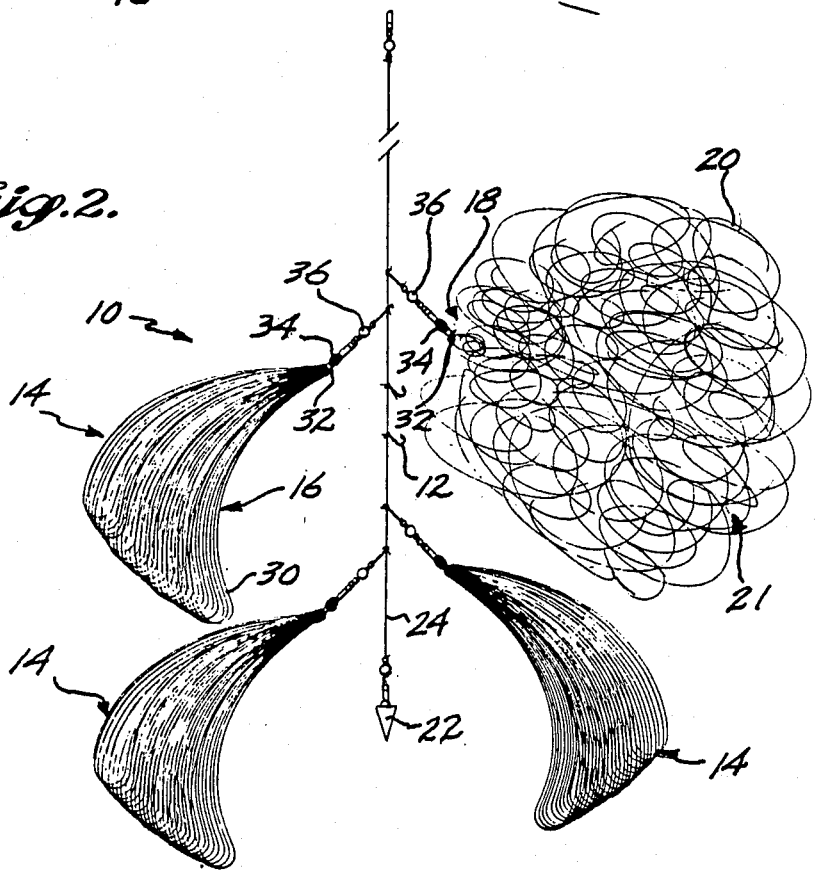
FIG. 2 is a side plan view of the shellfish lure of FIG. 1.

In the preferred embodiment illustrated in FIGS. 1 and 2, the shellfish lure 10 comprises a bait hook 12, a bundle 14 of untangled loops 16, a bundle 18 of loops 20, forming an entangled nest 21 and a weight 22, all attached to a main line 24. Preferably, the main line 24 is engaged to a pole 26 and spin casting reel 28.

FIG. 2 illustrates the bundle 14 of loops 16 in an untangled configuration as they would appear at the time of construction and during storage. The loops 16 are preferably formed of individual strands 30 of fifteen pound test monofilament line. Preferably, all of the strands 30 are bound at a common point by a metal crimp 32. To ensure proper functioning of the lure 10, the strands 30 must be constructed of resilient and flexible material that permits bending yet resists loss of resiliency when submerged in sea water and also resists permanent deformation under normal usage.

The proper construction and binding of the loop strands 30 at a common point by the crimp 32 enables the entangled nest 21 of loops 20 to remain in their entangled configuration during casting and while they are submerged and to prevent entanglement of the nests with each other. In each bundle 14 and 18, the strands 30 have both of their ends 34 bound together with the crimp 32. It has been found that strands having a measured length from end to end of approximately 16 inches work well in capturing crabs, lobsters and similarly sized crustaceans. Lengths of approximately 8 inches would be used to catch smaller shellfish, such as crayfish.

The bundles 14 and 18 are attached to the main line 24 by snap swivels 36. Also attached to the main line 24 are the bait hooks 12 that are positioned so that the bundles 14 and 18 lie around, and preferably overlap, the hooks 12 when the lure 10 is cast into the water. Preferably the main line 24 is constructed of at least forty-pound test monofilament line. Located at the end of the main line 24 is the weight 22 having a suitable mass to pull the lure 10 to the sea floor when bait is attached to the hooks 12. In the lure 10 shown in FIG. 2, a three ounce pyramid lead weight 22 was found to work satisfactorily in catching crabs. When the above-described configuration was tested, it consistently caught over thirty pounds of crabs with each cast.

Although the preferred embodiment illustrated in FIG. 2 depicts four bundles 14 and 18 positioned in pairs above and below the two hooks 12, it is to be realized that variations of this configuration may be constructed and used without departing from the spirit and scope of the present invention. For instance, only one bundle of loops may be used in conjunction with a single hook.

In operation, the lure 10 is engaged with a pole 26 and spin casting reel 28 by means of the main line 24. Bait (not shown) of a suitable substance to attract the desired shellfish, in this case crabs 38, is then placed on the hooks 12. The loops 20 are pulled apart and entangled by hand to form the nest 21 of entangled loops 20 as illustrated in FIG. 2. The loops 20 should be sufficiently entangled to form a large bulky mass of line to easily ensnare the shellfish.

The lure 10 is then cast into the water and allowed to settle on the sea floor. The main line 24 is then reeled in approximately two to five feet to ensure the nests 21 surround or overlap the baited hooks 12. After a suitable amount of time, which will be determined by the size of the lure and the nature of the desired catch, as well as the environment in which the lure 10 is used, the lure 10 is reeled in to retrieve the catch. As illustrated, the crabs 38 entangled in the nests 21 can be quickly removed to allow the lure 10 to be used again.

The lure 10 may be easily stored by leaving the bundles 14 freely hanging in the untangled configuration. Alternatively, the bundles 18 may be disentangled to have the loops 20 lying substantially coplaner, as shown by bundles 14, to be bound together by a suitable fastener such as a wire.

It is to be understood that while a preferred embodiment of the invention has been illustrated and described, it will be appreciated that various changes can be made therein without the parting from the spirit and scope of the invention. Consequently, the invention can be practiced otherwise than as specifically described herein.

The embodiments of the invention in which an exclusive property or privilege is claimed are defined as follows:

1. A shellfish lure suitable for spin casting, the lure comprising:
   one or more nests of entangled loops formed from a plurality of resilient strands bound together at a common point in parallel by a means for binding; and
   means for holding bait in close proximity to said one or more nests of entangled loops such that shellfish attracted to the bait will become entangled in said one or more nests.

2. A shellfish lure suitable for spin casting, the lure comprising:
   a main line;
   means for holding bait on said main line; and
   a bundle of loops held by a crimping member encircling said bundle, each of said loops constructed from resilient strands of material for forming an entangled nest to ensnare shellfish attracted to bait held on the bait holding means.

3. The lure of claim 2, wherein said loops are further constructed of flexible monofilament line.

4. The lure of claim 3, wherein said loops are bound together at a common point.

5. The lure of claim 2, wherein said bundle is positioned on said main line adjacent said bait holding means to ensnare shellfish attracted to the bait.

6. The lure of claim 2, further comprising two or more bundles of loops.

7. The lure of claim 6, wherein said bundles are positioned on said main line adjacent said bait holding means to ensnare shellfish attracted to bait held on said bait holding means.

8. THe lure of claim 7, wherein said loops are further constructed of flexible monofilament line.

9. The lure of claim 8, wherein said loops in each bundle are bound together at a common point.

* * * * *